US012214569B2

(12) United States Patent
Al-Mousa

(10) Patent No.: US 12,214,569 B2
(45) Date of Patent: Feb. 4, 2025

(54) REMOVING WASTE FROM AN OILFIELD RIG

(71) Applicant: Saudi Arabian Oil Company, Dhahran (SA)

(72) Inventor: Ahmed Abdulaziz Al-Mousa, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 351 days.

(21) Appl. No.: 17/738,234

(22) Filed: May 6, 2022

(65) Prior Publication Data

US 2023/0356491 A1 Nov. 9, 2023

(51) Int. Cl.

*B30B 15/32* (2006.01)
*B30B 1/36* (2006.01)
*B30B 9/30* (2006.01)
*E21B 41/00* (2006.01)

(52) U.S. Cl.

CPC .............. *B30B 1/36* (2013.01); *B30B 9/3032* (2013.01); *B30B 9/3042* (2013.01); *B30B 15/32* (2013.01); *E21B 41/00* (2013.01); *E21B 41/005* (2013.01)

(58) Field of Classification Search

CPC .. B30B 1/36; B30B 9/32; B30B 9/321; B30B 9/301; B30B 9/3021; B30B 9/3032; B30B 9/3042; B30B 15/32; B30B 9/3046; E21B 41/00; E21B 41/005

See application file for complete search history.

(56) References Cited

U.S. PATENT DOCUMENTS

| | | | | | |
|---|---|---|---|---|---|
| 3,708,953 | A * | 1/1973 | Aluotto | B30B 9/3032 | 53/527 |
| 3,821,929 | A * | 7/1974 | Stapf | B30B 9/3096 | 53/527 |
| 3,828,663 | A * | 8/1974 | Poplinski | B30B 9/3096 | 100/249 |
| 4,212,240 | A | 7/1980 | Lee et al. | | |
| 4,492,156 | A * | 1/1985 | Zimmer | B30B 9/3032 | 100/255 |
| 4,554,868 | A * | 11/1985 | Zimmer | B30B 9/3042 | 454/307 |
| 5,255,982 | A | 10/1993 | Zimmer | | |
| 8,888,671 | B2 | 11/2014 | Paulsen | | |
| 2007/0056913 | A1 | 3/2007 | Burt | | |

FOREIGN PATENT DOCUMENTS

| | | | | |
|---|---|---|---|---|
| GB | 2028222 | A * | 3/1980 | B30B 9/3042 |
| NL | 9201262 | A | 2/1994 | |

* cited by examiner

*Primary Examiner* — Jimmy T Nguyen
(74) *Attorney, Agent, or Firm* — Fish & Richardson P.C.

(57) ABSTRACT

A waste disposal system for an oilfield rig includes a container that defines a volume sized to receive and store waste from an oilfield rig; a compression plate positioned in the volume, the compression plate sized to extend between and orthogonal to two sides of the container and in planar parallel with a back wall of the container; at least one powered arm connected to the compression plate and configured to adjust the compression plate between a retracted position in the volume adjacent the back wall and an extended position to compress the waste into at least one portion of compressed waste; and an adjustable door connected to the container opposite the back wall and configured to swing away from the container to release the at least one portion of compressed waste from the volume.

18 Claims, 3 Drawing Sheets

REMOVING WASTE FROM AN OILFIELD RIG

TECHNICAL FIELD

The present disclosure describes apparatus, systems, and methods for removing waste from an oilfield rig.

BACKGROUND

Oilfield rigs are large structures that can be located onshore or offshore. These rigs are used to drill and extract petroleum and natural gases that lie in rock formations. Rigs can produce large quantities of waste material. Waste is then transferred by trucks or boats for proper disposal.

SUMMARY

In an example implementation, a waste disposal system for an oilfield rig includes a container that defines a volume sized to receive and store waste from an oilfield rig; a compression plate positioned in the volume, the compression plate sized to extend between and orthogonal to two sides of the container and in planar parallel with a back wall of the container; at least one powered arm connected to the compression plate and configured to adjust the compression plate between a retracted position in the volume adjacent the back wall and an extended position to compress the waste into at least one portion of compressed waste; and an adjustable door connected to the container opposite the back wall and configured to swing away from the container to release the at least one portion of compressed waste from the volume.

In an aspect combinable with the example implementation, the at least one powered arm includes at least one hydraulic arm.

Another aspect combinable with any of the previous aspects further includes a lid mountable across at least a portion of a top surface of the container to at least partially enclose the volume.

In another aspect combinable with any of the previous aspects, the at least one powered arm is configured to move the compression plate to push the at least one portion of compressed waste through the adjustable door and outside of the volume.

In another aspect combinable with any of the previous aspects, the at least one powered arm is configured to couple to an oilfield rig power source.

In another aspect combinable with any of the previous aspects, the oilfield rig includes an onshore oilfield rig.

In another example implementation, a method for storing or disposing waste from an oilfield rig includes receiving waste from an oilfield rig into a volume of a container sized to receive and store the waste; operating, with a powered arm, a compression plate positioned in the volume to move from a retracted position in the volume to an extended position in the volume, the compression plate sized to extend between and orthogonal to two sides of the container and in planar parallel with a back wall of the container; compressing, with the compression plate, at least a portion of the waste in the volume as the compression plate moves from the retracted position into the extended position; and opening an adjustable door connected to the container opposite the back wall to swing away from the container to expose the compressed waste in the volume to an external environment through the opened door.

In an aspect combinable with the example implementation, the at least one powered arm includes at least one hydraulic arm.

In another aspect combinable with any of the previous aspects, the container further includes a lid mountable across at least a portion of a top surface of the container to at least partially enclose the volume.

Another aspect combinable with any of the previous aspects further includes operating, with the powered arm, the compression plate to push the compressed waste through the opened door and outside of the volume into the external environment.

Another aspect combinable with any of the previous aspects further includes providing power to the at least one powered arm from an oilfield rig power source.

In another aspect combinable with any of the previous aspects, the oilfield rig includes an onshore oilfield rig.

In another example implementation, an oilfield rig system includes at least one oilfield rig; and at least one waste disposal system. The waste disposal system includes a container that defines a volume sized to receive and store waste from the oilfield rig, a compression plate positioned in the volume, the compression plate sized to extend between and orthogonal to two sides of the container and in planar parallel with a back wall of the container, at least one powered arm connected to the compression plate, and an adjustable door connected to the container opposite the back wall. The oilfield rig system further includes a control system communicably coupled to the at least one powered arm and the adjustable door and configured to perform operations including operating the at least one powered arm to adjust the compression plate between a retracted position in the volume adjacent the back wall and an extended position to compress the waste into at least one portion of compressed waste, and operating the adjustable door to swing away from the container to release the at least one portion of compressed waste from the volume.

In an aspect combinable with the example implementation, the at least one powered arm includes at least one hydraulic arm.

In another aspect combinable with any of the previous aspects, the waste disposal system further includes a lid mountable across at least a portion of a top surface of the container to at least partially enclose the volume.

In another aspect combinable with any of the previous aspects, the control system is configured to perform operations including operating the at least one powered arm to move the compression plate to push the at least one portion of compressed waste through the adjustable door and outside of the volume.

In another aspect combinable with any of the previous aspects, the at least one powered arm is configured to couple to an oilfield rig power source.

In another aspect combinable with any of the previous aspects, the oilfield rig includes an onshore oilfield rig.

Implementations of systems and methods for removing waste from an oilfield rig according to the present disclosure may include one or more of the following features. For example, systems and methods for removing waste from an oilfield rig according to the present disclosure can store oilfield waste in a convenient and efficient location and manner until final disposal. As another example, systems and methods for removing waste from an oilfield rig according to the present disclosure can accept and store more oilfield waste by periodically compressing the stored waste to reduce volume.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
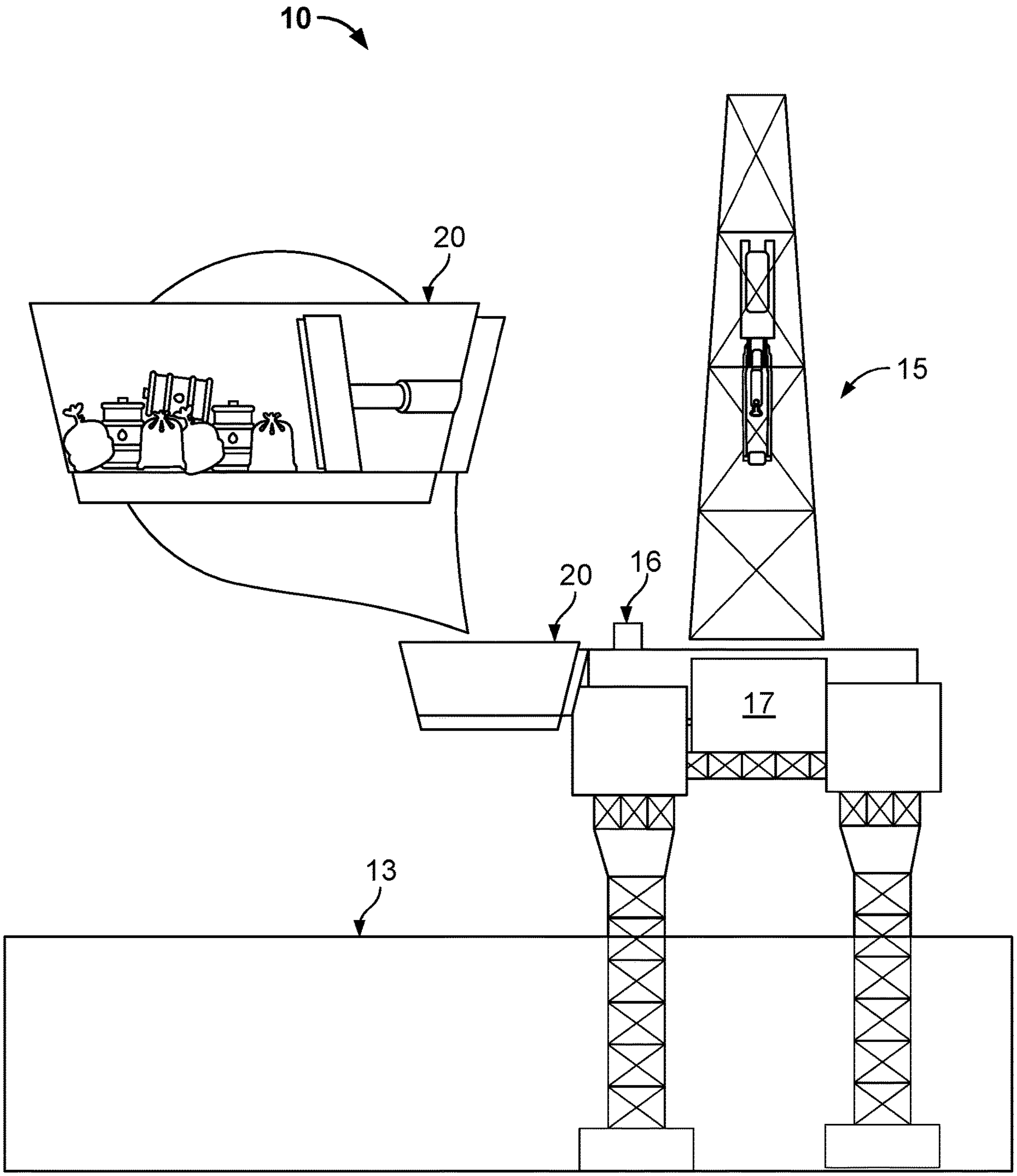
FIG. 1 is a schematic diagram of an example implementation of an oilfield rig system that includes a waste disposal system for an oilfield rig according to the present disclosure.

FIG. 1 is a schematic diagram of an example implementation of an oilfield rig system 10 that includes a waste disposal system 20 for an oilfield rig 15 according to the present disclosure. Generally, oilfield rigs, such as oilfield rig 15, are large structures that can be located on land or on a body of water. These rigs can be used to drill and hydrocarbon (and other) resources from subterranean formations. These rigs can also produce large quantities of waste material through the exploration and production of hydrocarbons, as well as from day-to-day human activities. Typically, a final disposal location of the waste material is not located in the vicinity of the oilfield rig (and can be, in the case of rigs on bodies of water, only located on land). Thus, collected waste material must be transferred to vehicles (for example, boats, trucks, or a combination thereof) for proper disposal in designated waste location area. Each transfer and vehicle trip involved in this process can increase time and costs to the hydrocarbon exploration and production process, as well as raise environmental concerns.

In this example implementations, the oilfield rig 15, while shown positioned on a body of water 13, can represent any drilling, production, or completion rig used to explore for and/or produce hydrocarbon resources from a subterranean formation, whether on body of water 13 or on a terranean surface (whether on Earth or otherwise). Further although one waste disposal system 20 is shown, the oilfield rig system 10 can include multiple waste disposal systems 20 (for example, based on an expected amount of waste generated in the system 10), as well as multiple oilfield rigs 15 (with a single or multiple waste disposal systems 20).

As shown in FIG. 1, the waste disposal system 20 is positioned on a side of the oilfield rig 15, such as to maximize an amount of rig platform area for exploration and production equipment and activities. Alternatively, the waste disposal system 20 can be positioned on a rig platform, under the rig platform, or next to the oilfield rig 15 (for example, on a terranean surface in the case of a land-based oilfield rig). In some aspects, the waste disposal system 20 can be isolated from human-occupied areas due to, for example, a possibility of having hazardous materials and chemicals disposed of in the waste disposal system 20 that can harm the environment. One or more power consuming components (for example, powered arms) of the waste disposal system 20 can be operably coupled to a power generation source 17 on the oilfield rig 15, such as one or more engines (natural gas, diesel), one or more electric motors, or hydraulic or pneumatic power sources.

Figure 2A:
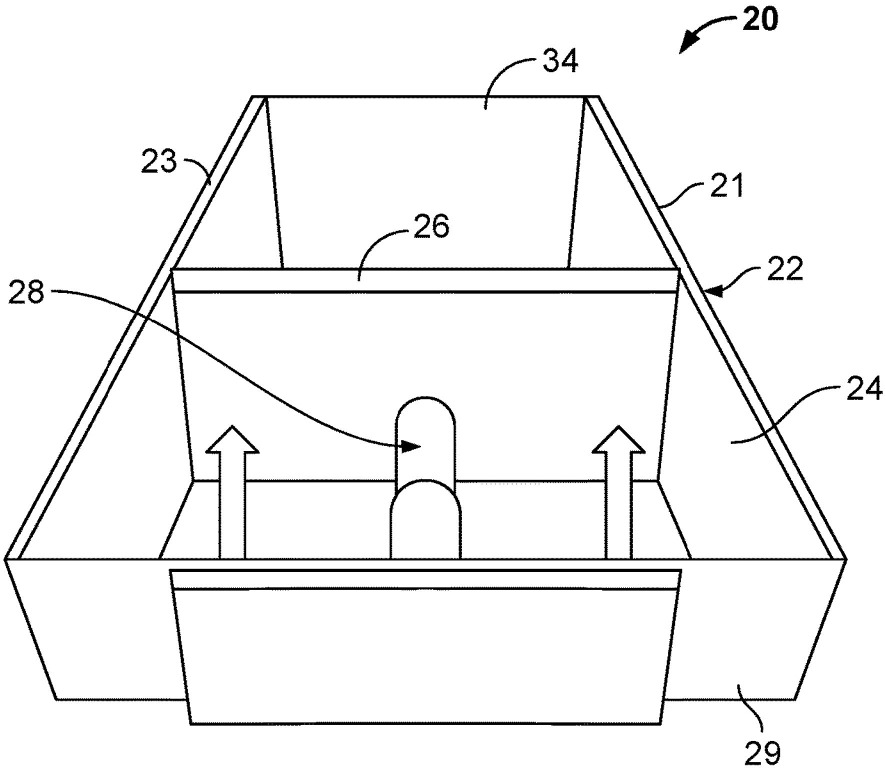
FIG. 2A-2B are top isometric and side views, respectively, of an example implementation of a waste disposal system for an oilfield rig according to the present disclosure.
Figure 2B:
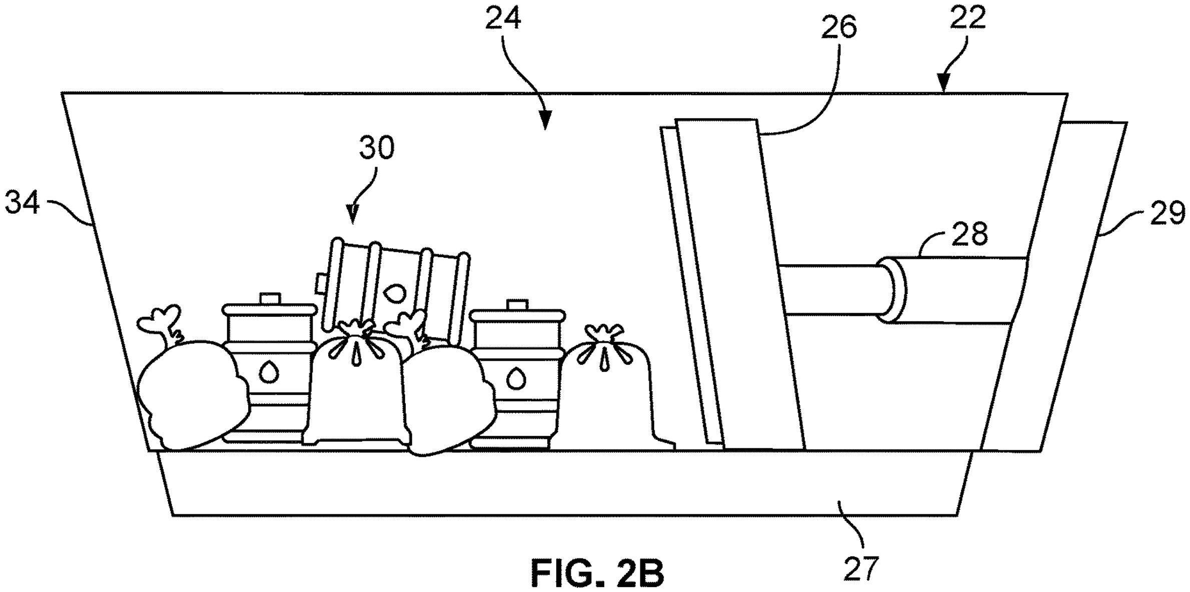
Figure 3A:
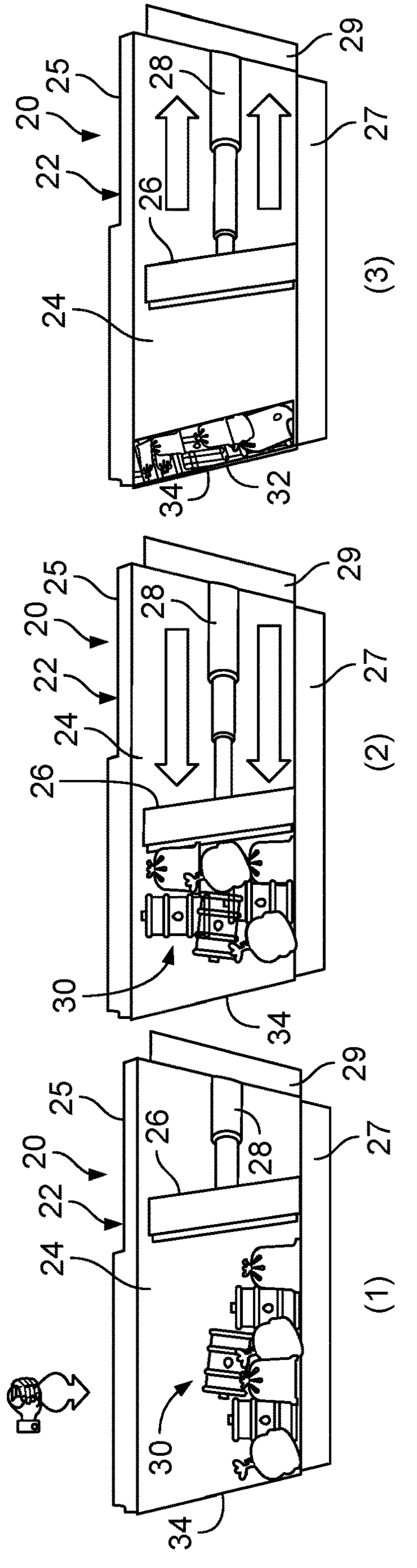
FIGS. 3A-3B are schematic illustrations of a sequence of operations performed by or with a waste disposal system for an oilfield rig according to the present disclosure.
Figure 3B:
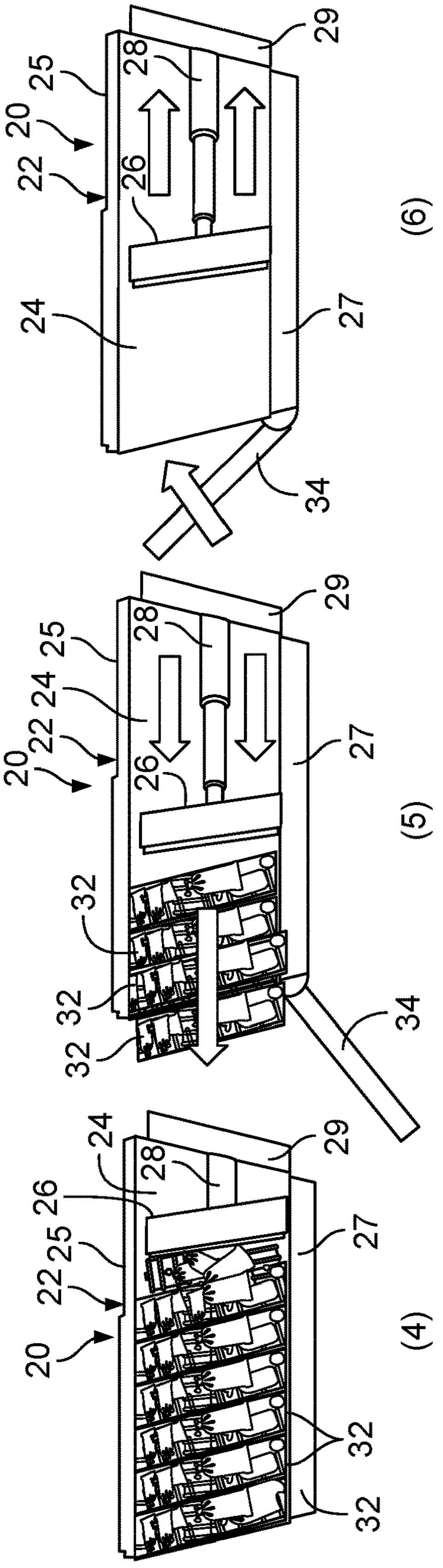

FIG. 2A-2B are top isometric and side views, respectively, of the example implementation of the waste disposal system 20 for an oilfield rig according to the present disclosure. In this example implementation of waste disposal system 20, the system 20 includes a container 22 that defines a volume 24 into which waste 30 can be placed. The container 22, in this example, is formed by sides 21 and 23, as well as a back 29 and a door 34, each of which is coupled or attached to a base 27. As shown in FIGS. 3A-3B, a cover or lid 25 can be detachably mounted on top edges of the sides 21 and 23, back 29, and door 34 to at least partially enclose the volume 24. Dimensions of the container 22 (for example, length of sides 21 and 23, widths of the back 29 and the door 34, and depth of the volume 24) are customizable based on, for example, an amount of expected waste 30 to be received, space on or near an oilfield rig, or other considerations. Further, although the container 22 is shown as a rectangular prism or parallelepiped, other shapes are also contemplated by the present disclosure.

As shown in FIGS. 2A-2B, a compression plate 26 is positioned within the volume 24 and parallel to the back 29 and door 34 (and substantially orthogonal to the sides 21 and 23). The compression plate 26 is mounted (at a face of the plate 26) to one or more powered arms 28 (one shown, but more than one also contemplated). In this example implementation, the one or more powered arms 28 comprise hydraulic arms 28 (for example, cylinder in piston devices in which hydraulic fluid is used to extend the cylinder from the piston), but other forms of power (besides or in addition to hydraulic) can also be used by the powered arm 28. Power components that may be necessary to provide power to the powered arm 28 (for example, hoses, pumps, valves, and otherwise) can be enclosed in the back 29 or external to the container 22.

In some aspects, a control system 16 (shown in FIG. 1) that is positioned on the oilfield rig 15 or on the waste disposal system 20 can control one or more components of the waste disposal system 20, such as the power components or a door 34. In certain example implementations, the control system 16 comprises a mechanical controller or an electro-mechanical controller. In some aspects, the control system 16 can be a microprocessor-based controller. The control system 16 can be used for the operations described in association with any automated or computer-implemented methods described herein. The control system 16, in these aspects, is intended to include various forms of digital computing hardware. Generally, the control system 16 can include one or more processors, one or more memory components, and, in some aspects, an input/output device. Each of the components can be interconnected using a system bus.

Certain features of the described control system 16 can be implemented in digital electronic circuitry in the control system 16, or in computer hardware, firmware, software, or in combinations of them. Features can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

In this example, the one or more powered arms 28 are attached to the compression plate 26 to forcibly slide the compression plate 26 within the volume 24 in a bi-directional motion as indicated by the arrows in FIG. 2A (in other words, in directions parallel to the sides 21 and 23). As shown in this example, the compression plate 26 extends across the volume 24 from side 21 to side 23, as well as from the base 27 to a top edge of the sides 21, 23. Thus, as the compression plate 26 divides the volume 24 into two sub-volumes (as shown), movement of the compression plate 26 adjusts the relative ratios of the sub-volumes relative to the volume 24. In alternative implementations, the compression plate 26 can be shorter than the sides 21 and 23.

FIGS. 3A-3B are schematic illustrations of a sequence of operations performed by or with the waste disposal system 20 for an oilfield rig according to the present disclosure. FIG. 3A shows example steps (1)-(3) in an example operation, while FIG. 3B shows example steps (4)-(6) in an example operation. Steps (1)-(6), collectively, show an example operation of loading waste 30 into the container 22, compressing waste 30 in the container 22, and relieving the compressed waste 32 from container 22.

Turning to FIG. 3A, step (1) shows waste 30 being placed into the volume 24 of the container 22. As placed, the waste 30 is uncompressed. The waste 30 can include solid waste, liquid waste, metals, plastics, wood, paper, composites, hazardous, and non-hazardous waste; in other words, any particular form of waste found on an oilfield rig. In step (1) the compression plate 26 is in a retracted position in that the plate 26 is at or adjacent the back 29 of the container 22. Step (2) shows the waste 30 being compressed by the compression plate 26, which is urged to an extended position closer to the door 34 (in a direction according to the arrows) by the powered arm 28. Step (2) can occur, in some aspects, automatically by the waste disposal system 20 when it has been determined that the waste 30 fills all or a particular portion of the volume 24. Step (2) can also occur when an operator of the waste disposal system 20 determines (for example, visually or otherwise) that the waste 30 fills all or a particular portion of the volume 24. Step (3) shows a portion of compressed waste 32, with the compression plate 26 moving (or moved) back to the retracted position by the powered arm 28. Subsequent to step (3), additional, uncompressed waste 30 can be placed in the volume 24 in a space vacated by the compression of step (2).

Turning to FIG. 3B, step (4) shows that additional waste 30 has been placed in the volume 24 and compressed (by the compression plate 26 and powered arm 28) into additional portions of compressed waste 32, which now take up the volume 24. In step (5) the compression plate 26 is in the retracted position. Step (5) shows the door 34 being adjusted from a closed position to an open position; in this example by being pivotally connected to the base 27 and swung open to allow access to the volume 24. Step (6) shows the portions of compressed waste 32 being urged out of the volume 24, through the door 34, by the compression plate 26 as the powered arm 28 urges the plate 26 from the retracted position to the extended position. By doing so, the compression plate 26 pushes the compressed waste 32 out of the container 22. In some aspects, step (5) occurs subsequent to the container 22 being moved, such as from an oilfield rig to another location. Alternatively, step (5) can occur with the container 22 at the oilfield rig in order to move the compressed waste 32, for example, to another vehicle for final disposal. Step (6) shows with the compression plate 26 moving (or moved) back to the retracted position by the powered arm 28, with the volume 24 empty and ready to receive more waste 30, and the door 34 moving back to the closed position.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. An oilfield rig waste disposal system, comprising:

a container mounted on a side of an oilfield rig adjacent a rig platform area, the container defining a volume sized to receive and store oilfield rig waste, the container positioned to hang off the side of the oilfield rig adjacent the rig platform area;

a compression plate positioned in the volume, the compression plate sized to extend between and orthogonal to two sides of the container and in planar parallel with a back wall of the container;

at least one powered arm connected to the compression plate and configured to adjust the compression plate between a retracted position in the volume adjacent the back wall and an extended position to compress the oilfield rig waste into at least one portion of compressed waste; and an adjustable door connected to the container opposite the back wall and configured to swing away from the container to release the at least one portion of compressed waste from the volume.

2. The waste disposal system of claim 1, wherein the at least one powered arm comprises at least one hydraulic arm.

3. The waste disposal system of claim 1, further comprising a lid mountable across at least a portion of a top surface of the container to at least partially enclose the volume.

4. The waste disposal system of claim 1, wherein the at least one powered arm is configured to move the compression plate to push the at least one portion of compressed waste through the adjustable door and outside of the volume.

5. The waste disposal system of claim 1, wherein the at least one powered arm is configured to couple to an oilfield rig power source.

6. The waste disposal system of claim 1, wherein the oilfield rig comprises an onshore oilfield rig.

7. A method for storing or disposing waste from an oilfield rig, comprising:

receiving oilfield rig waste from an oilfield rig into a volume of a container sized to receive and store the waste, the container mounted on a side of an oilfield rig adjacent a rig platform area and the container positioned to hang off the side of the oilfield rig adjacent the rig platform area;

operating, with a powered arm, a compression plate positioned in the volume to move from a retracted position in the volume to an extended position in the volume, the compression plate sized to extend between and orthogonal to two sides of the container and in planar parallel with a back wall of the container;

compressing, with the compression plate, at least a portion of the oilfield rig waste in the volume as the compression plate moves from the retracted position into the extended position; and opening an adjustable door connected to the container opposite the back wall to swing away from the container to expose the compressed waste in the volume to an external environment through the opened door.

8. The method of claim 7, wherein the at least one powered arm comprises at least one hydraulic arm.

9. The method of claim 7, wherein the container further comprises a lid mountable across at least a portion of a top surface of the container to at least partially enclose the volume.

10. The method of claim 7, further comprising operating, with the powered arm, the compression plate to push the compressed waste through the opened door and outside of the volume into the external environment.

11. The method of claim 7, further comprising providing power to the at least one powered arm from an oilfield rig power source.

12. The method of claim 7, wherein the oilfield rig comprises an onshore oilfield rig.

13. An oilfield rig system, comprising:

at least one oilfield rig; and at least one waste disposal system comprising:

a container mounted on a side of the oilfield rig adjacent a rig platform area that defines a volume sized to receive and store waste from the oilfield rig, the container positioned to hang off the side of the oilfield rig adjacent the rig platform area, a compression plate positioned in the volume, the compression plate sized to extend between and orthogonal to two sides of the container and in planar parallel with a back wall of the container, at least one powered arm connected to the compression plate, and an adjustable door connected to the container opposite the back wall; and a control system communicably coupled to the at least one powered arm and the adjustable door and configured to perform operations comprising:

operating the at least one powered arm to adjust the compression plate between a retracted position in the volume adjacent the back wall and an extended position to compress the waste into at least one portion of compressed waste, and operating the adjustable door to swing away from the container to release the at least one portion of compressed waste from the volume.

14. The oilfield rig system of claim 13, wherein the at least one powered arm comprises at least one hydraulic arm.

15. The oilfield rig system of claim 13, wherein the waste disposal system further comprises a lid mountable across at least a portion of a top surface of the container to at least partially enclose the volume.

16. The oilfield rig system of claim 13, wherein the control system is configured to perform operations comprising:

operating the at least one powered arm to move the compression plate to push the at least one portion of compressed waste through the adjustable door and outside of the volume.

17. The oilfield rig system of claim 13, wherein the at least one powered arm is configured to couple to an oilfield rig power source.

18. The oilfield rig system of claim 13, wherein the oilfield rig comprises an onshore oilfield rig.

* * * * *